(12) United States Patent
Kitanaka

(10) Patent No.: US 9,434,259 B2
(45) Date of Patent: Sep. 6, 2016

(54) ELECTRIC VEHICLE CONTROL APPARATUS

(75) Inventor: Hidetoshi Kitanaka, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 70 days.

(21) Appl. No.: 14/399,423

(22) PCT Filed: Jun. 7, 2012

(86) PCT No.: PCT/JP2012/064718
§ 371 (c)(1),
(2), (4) Date: Nov. 6, 2014

(87) PCT Pub. No.: WO2013/183152
PCT Pub. Date: Dec. 12, 2013

(65) Prior Publication Data
US 2015/0266384 A1    Sep. 24, 2015

(51) Int. Cl.
*H02P 7/00* (2016.01)
*B60L 9/24* (2006.01)
(Continued)

(52) U.S. Cl.
CPC .. *B60L 9/24* (2013.01); *B60L 3/00* (2013.01); *B60L 9/22* (2013.01); *B60L 11/005* (2013.01); *B60L 11/1803* (2013.01); *B60L 13/00* (2013.01); *B60L 15/20* (2013.01); *B60L 2200/26* (2013.01); *B60L 2210/10* (2013.01);
(Continued)

(58) Field of Classification Search
CPC ............... Y02T 10/7275; B60L 15/20; B60L 2200/26; B60L 2210/10; B60L 3/00
See application file for complete search history.

(56) References Cited

U.S. PATENT DOCUMENTS

| 2011/0030574 A1 | 2/2011 | Kitanaka |
| 2011/0144831 A1 | 6/2011 | Hata |
| 2014/0184165 A1* | 7/2014 | Takahashi ........... H01M 10/486 320/134 |

FOREIGN PATENT DOCUMENTS

| CA | 2725409 A1 | 11/2009 |
| EP | 2275300 A1 | 1/2011 |

(Continued)

OTHER PUBLICATIONS

International Search Report (PCT/ISA/210) mailed on Sep. 18, 2012, by the Japanese Patent Office as the International Searching Authority for International Application No. PCT/JP2012/064718.

(Continued)

*Primary Examiner* — Karen Masih
(74) *Attorney, Agent, or Firm* — Buchanan Ingersoll & Rooney PC

(57) ABSTRACT

An electric vehicle control apparatus includes a plurality of current collectors that take in electric power from an outside, a convertor unit that converts a voltage input through the current collectors into a direct current having a predetermined value, and a power storage unit connected to and charged and discharged by the convertor unit. The convertor unit includes a convertor circuit and a control unit. The control unit includes a current adjusting unit that generates a current command which is a command for an electric current of the convertor circuit, and adjusts the magnitude of the current command on the basis of a current collector state signal. The control unit further includes a current control unit that controls the electric current of the convertor circuit on the basis of the current command.

6 Claims, 5 Drawing Sheets

(51) Int. Cl.
*B60L 9/22* (2006.01)
*B60L 11/00* (2006.01)
*B60L 11/18* (2006.01)
*B60L 15/20* (2006.01)
*B60L 13/00* (2006.01)
*B60L 3/00* (2006.01)

(52) U.S. Cl.
CPC ....... *B60L 2240/12* (2013.01); *B60L 2240/36* (2013.01); *B60L 2240/421* (2013.01); *Y02T 10/645* (2013.01); *Y02T 10/7005* (2013.01); *Y02T 10/7022* (2013.01); *Y02T 10/7216* (2013.01); *Y02T 10/7275* (2013.01)

(56) References Cited

FOREIGN PATENT DOCUMENTS

| | | |
|---|---|---|
| JP | 51-124217 A | 10/1976 |
| JP | 60-087603 A | 5/1985 |
| JP | 61-227602 A | 10/1986 |
| JP | 63-048101 A | 2/1988 |
| JP | 2005-278269 A | 10/2005 |
| JP | 4846064 B2 | 10/2011 |
| KR | 10-2011-0004402 A | 1/2011 |
| KR | 10-2011-0025988 A | 3/2011 |
| KR | 10-2012-00021777 A | 1/2012 |
| WO | 2009133608 A1 | 11/2009 |
| WO | WO 2009/133608 A1 | 11/2009 |

OTHER PUBLICATIONS

Written Opinion (PCT/ISA/237) mailed on Sep. 18, 2012, by the Japanese Patent Office as the International Searching Authority for International Application No. PCT/JP2012/064718.

Extended European Search Report dated Feb. 2, 2016 issued in corresponding European Patent Appln. No. 12878566.4 (10 pages).

Korean Office Action with partial English Translation, corresponding to Korean Patent Application No. 10-2014-7033690, dated Dec. 31, 2015; 10 pages.

Canadian Office Action corresponding to Canadian Patent Application No. 2,873,919, issued Jan. 7, 2016; 4 pages.

* cited by examiner

ELECTRIC VEHICLE CONTROL APPARATUS

FIELD

The present invention relates to an electric vehicle control apparatus served for propulsion control of an electric vehicle.

BACKGROUND

In general, an electric vehicle is configured to take in electric power from an overhead wire with a current collector and drive an electric motor with a power converting device such as an inverter using the taken-in electric power to travel.

In the electric vehicle, when the brake is applied to a car, a so-called regenerative brake that regeneratively operates an electric motor to obtain a brake force is used. Regenerative power generated at this point is supplied to loads such as air conditioners of other power-running cars and cars present near the own car via an overhead wire, a third rail, and the like and consumed by the loads.

However, in the early morning, at night, and a quiet railroad section, other cars are sometimes absent near the own car (regenerative loads are insufficient). The regenerative power generated by the regenerative brake is sometimes not sufficiently consumed. When the regenerative power of the own car is larger than electric power consumed by the other cars, an overhead wire voltage rises. It is likely that various devices connected to the overhead wire are tripped or broken by an overvoltage.

Therefore, when the overhead wire voltage rises, an inverter device performs regeneration squeezing control for squeezing the regenerative brake and suppressing the generation of the regenerative power. In this case, because a regenerative braking force is reduced by the regeneration squeezing control, the reduced and insufficient brake force is supplemented by a friction brake.

On the other hand, the use of the friction brake leads to exhausting a part of kinetic energy of the electric vehicle, which is originally capable of performing power regeneration, to the atmosphere as heat. Therefore, there is a problem in terms of energy saving.

Therefore, a system has been developed in which a power storage device such as a secondary cell or an electric double layer capacitor is mounted on an electric vehicle and regenerative power is stored in the power storage device according to necessity to obtain a stable regenerative brake even when regenerative loads are insufficient (see, for example, Patent Literature 1). Note that the electric power stored in the power storage device can be used when the electric vehicle accelerates next time. Therefore, power saving is attained.

The electric vehicle mounted with the power storage device can travel on a non-electrified route without a facility of an overhead wire. In this case, the electric vehicle drives an electric motor and accelerates using only electric power from the power storage device. Regenerative power generated by the electric motor during braking is entirely stored in the power storage device.

CITATION LIST

Patent Literature

Patent Literature 1: Japanese Patent Application Laid-Open No. 2005-278269

SUMMARY

Technical Problem

When the electric vehicle mounted with the power storage device operates in a non-electrified section at a relatively long distance, the operation is not economical because a large number of power storage devices are mounted on a car. Therefore, a form is conceivable in which a conductor for charging (hereinafter also referred to as overhead wire) connected to a transformer substation or a charging facility functioning as a power supply is set in a terminal station, an intermediate station, an intermediate section, or the like of the non-electrified section and the overhead wire and a current collector (hereinafter also referred to as pantograph) are brought into contact with each other to perform charging (additional charging) for the power storage device, a charging amount of which decreases because of traveling in the non-electrified section.

In this form, the electric vehicle lifts the pantograph while traveling under an overhead wire for charging or stops right under the overhead wire for charging and lifts the pantograph, brings the pantograph into contact with the overhead wire for charging, and electrically connects the pantograph to the overhead wire for charging. Consequently, a voltage is applied to the pantograph. Therefore, the electric vehicle detects the voltage with an electric vehicle control apparatus and starts a charging operation for the power storage device via a power converting unit such as a converter circuit.

In the charging operation, it is necessary to recover the charging amount of the power storage device as quickly as possible. Therefore, the electric vehicle performs the charging with a large current via the pantograph. Note that, while the electric vehicle is traveling, a contact point of the overhead wire and the pantograph always slides and moves. Therefore, heat generating points by contact resistance disperse and there is a cooling effect due to a traveling wind. Therefore, a relatively large current can be fed to the pantograph.

However, while the power storage device is charged during the stop of the electric vehicle, a heat generating place is localized because the contact point of the overhead wire and the pantograph does not change. Further, the temperature of the contact point of the overhead wire and the pantograph tends to rise because there is no traveling wind. Therefore, the magnitude of the electric current that can be fed to the pantograph decreases compared with the magnitude of the electric current fed during the traveling.

A configuration is conceivable in which, to enable charging with a large current during the stop of the electric vehicle while suppressing a temperature rise of the contact point of the overhead wire and the pantograph, a plurality of pantographs electrically connected to one another are mounted on the electric vehicle to disperse an electric current flowing to the pantographs.

As a problem of such a configuration, it is assumed that a part of the pantographs do not normally operate. For example, a part of the pantographs are broken, do not sufficiently rise, and do not come into contact with the overhead wire. Even in this case, a voltage is applied to the power converting unit from the other electrically-connected normal pantographs. Therefore, the electric vehicle control apparatus recognizes that the pantographs are normally connected to the overhead wire and starts the charging operation for the power storage device with an electric current set in advance.

In this case, an electric current larger than usual flows into the non-defective pantographs, and the temperature of the contact point of the pantograph and the overhead wire excessively rises. It is likely that damage to the normal pantographs and the overhead wire such as erosion and fusing of the contact point is caused. Then, the charging to the power storage device is impossible and the electric vehicle is unable to travel.

The present invention has been devised in view of the above, and it is an object of the present invention to provide an electric vehicle control apparatus capable of charging a power storage device during traveling and during a stop of an electric vehicle while suppressing a temperature rise of a contact point of a pantograph and an overhead wire.

Solution to Problem

The present invention is directed to an electric vehicle control apparatus that achieves the object. The electric vehicle control apparatus includes a plurality of current collectors that take in electric power from an outside; a power converting unit that converts a voltage input through the current collectors into a direct current having a predetermined value and outputs the direct current; and a power storage unit connected to and charged and discharged by the power converting unit. The power converting unit includes a main circuit unit and a control unit. The control unit includes a current adjusting unit that generates a current command which is a command for an electric current of the main circuit unit, and adjusts the magnitude of the current command on the basis of a current collector state signal, the current collector state signal indicating whether the current collectors are in a state in which the current collectors can normally take in the electric power from the outside; and a current control unit that controls the electric current of the main circuit unit on the basis of the current command.

Advantageous Effects of Invention

According to the present invention, there is an effect that it is possible to charge a power storage device during traveling and during a stop of an electric vehicle while suppressing a temperature rise of a contact point of a pantograph and an overhead wire.

DESCRIPTION OF EMBODIMENTS

Embodiments of an electric vehicle control apparatus according to the present invention are explained in detail below with reference to the drawings. Note that the present invention is not limited by the embodiments.

First Embodiment

Figure 1:
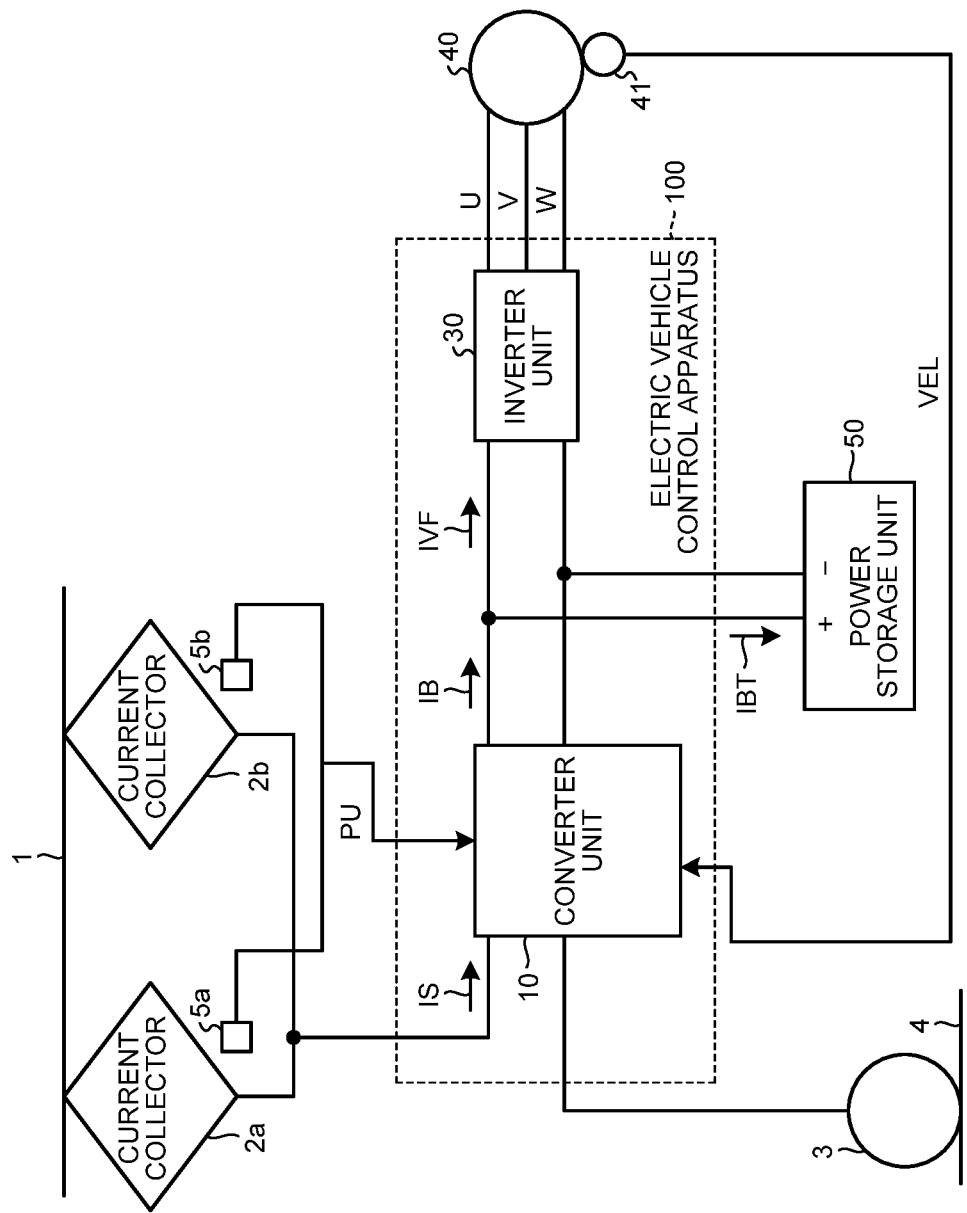
FIG. 1 is a diagram of a configuration example of an electric vehicle control apparatus in a first embodiment.

FIG. 1 is a diagram of a configuration example of a first embodiment of the electric vehicle control apparatus according to the present invention. An electric vehicle control apparatus 100 in this embodiment is a control apparatus that controls driving of an electric vehicle. As shown in FIG. 1, electric power from a transformer substation, which is an external power supply, not shown in the figure is input from an overhead wire (a conductor) 1 to a converter unit 10, which is a power converting unit and is, for example, a DC (Direct Current)-DC converter, via current collectors 2a and 2b. A return current from the converter unit 10 is connected to a rail 4 through a wheel 3 of the electric vehicle and returns to a negative side of the not-shown transformer substation.

In FIG. 1, the current collectors 2a and 2b are shown as pantographs. However, the current collectors 2a and 2b can be current collectors having other shapes. For example, when the overhead wire 1 is a third rail, the current collectors 2a and 2b are current collecting shoes corresponding to the third rail. Note that the current collectors 2a and 2b are electrically connected to each other. Note that the number of current collectors electrically connected to one another is not limited. The present invention can be applied as long as a plurality of current collectors is electrically connected to one another.

Note that current-collector-state detecting units 5a and 5b are respectively provided in the current collectors 2a and 2b. The current-collector-state detecting units 5a and 5b detect or determine whether the current collectors 2a and 2b are respectively in a normal contact state with the overhead wire 1 (a state in which the current collectors 2a and 2b can normally take in electric power from the outside) and outputs a result of the detection or the determination as a current collector state signal PU.

Specifically, for example, when the current collectors 2a and 2b are the pantographs, the current-collector-state detecting units 5a and 5b only have to be configured to determine, using a sensor or the like, whether the pantographs are not in a folded state and whether the pantographs rise sufficiently for coming into contact with the overhead wire 1.

The converter unit 10 includes a converter circuit 13, which is a main circuit that performs direct current/direct current conversion, and a control unit 14. For example, the converter unit 10 converts a voltage of about DC 1500 volts of the overhead wire 1 into a voltage (e.g., about 700 volts) of a power storage unit 50 and outputs the voltage. Note that a voltage value converted by the converter unit 10 is not limited to this example.

Note that, in the above explanation, the overhead wire 1 is a direct-current power supply. However, when the overhead wire 1 is an alternating-current power supply, the converter circuit 13 is suitably a PWM (Pulse Width Modulation) converter circuit, which is a circuit capable of bidirectionally converting input alternating-current power into direct-current power.

An inverter unit 30 is connected to an output of the converter unit 10. The inverter unit 30 includes an inverter circuit, which is a main circuit that performs direct current/alternating current conversion. The inverter circuit is suitably a voltage-type PWM inverter circuit. Because a circuit configuration of the inverter circuit is publicly known, explanation of the circuit configuration is omitted.

The power storage unit 50 is connected to the output of the converter unit 10. A power storage device such as a secondary cell or a capacitor is incorporated in the power storage unit 50. Electric energy necessary for the electric vehicle to travel a predetermined distance can be charged in the power storage unit 50.

An electric motor 40 is connected to an alternating-current output side of the inverter unit 30. A plurality of electric motors 40 can be connected in parallel. The electric motor 40 drives the wheel 3 and causes the electric vehicle to travel. A rotation detector 41, which detects rotating speed of the electric motor 40, is provided in the electric motor 40. The rotation detector 41 inputs speed VEL, which is rotating speed information of the electric motor 40, to the converter control unit 14. Note that the rotating speed information of the electric motor 40 is not limited to be obtained by the rotation detector 41 and can be obtained using other means.

Note that the inverter unit 30 can include an auxiliary power supply device that performs power supply to an auxiliary machine such as an air conditioner.

In the example shown in FIG. 1, a form is shown in which one converter unit 10, one inverter unit 30, and one power storage unit 50 are connected. However, the present invention can also be applied when a plurality of converter unit 10, a plurality of inverter units 30, and a plurality of power storage unit 50 are connected.

In the example shown in FIG. 1, a configuration is shown in which the inverter unit 30 is connected to the output of the converter unit 10. However, a form other than the configuration can be adopted. For example, a form can be adopted in which the converter unit 10 and the inverter unit 30 are connected in parallel to the current collectors 2a and 2b. The present invention can be applied as long as the power storage unit 50 is connected to the output of the converter unit 10.

Figure 2:
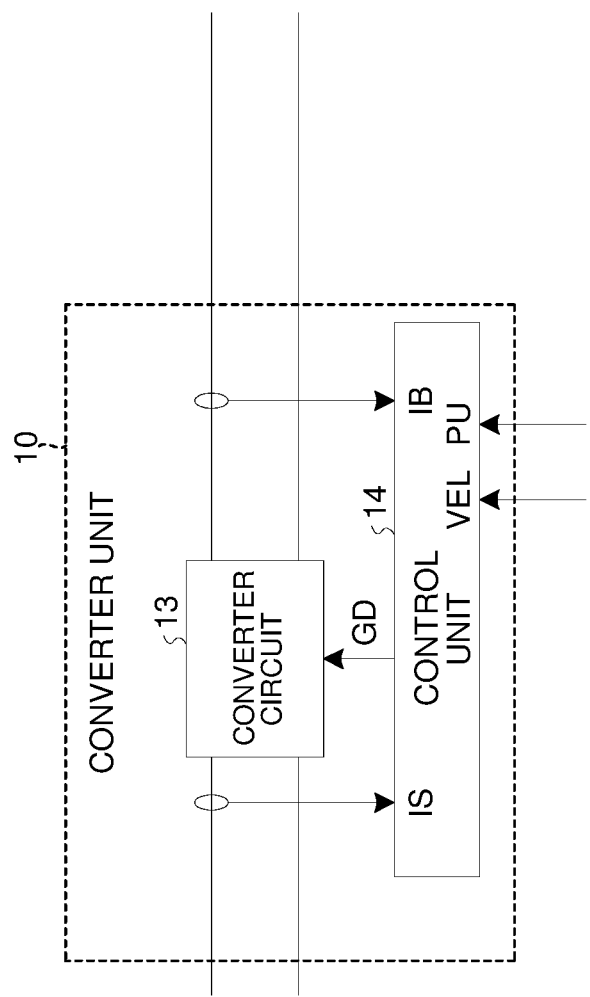
FIG. 2 is a diagram of a configuration example of a converter unit in the first embodiment.

The configuration of the converter unit 10 is explained. FIG. 2 is a diagram of a configuration example of the converter unit 10 in the first embodiment of the present invention. The converter unit 10 includes the converter circuit 13, which is a main circuit and a power converting circuit, and the control unit 14 that ON/OFF-controls a switching device (not shown in the figure) included in the converter circuit 13.

A signal IS, which is a signal indicating an input current to the converter circuit 13, a signal IB, which is a signal indicating an output current from the converter circuit 13, a signal VEL, which is a signal indicating speed of the electric vehicle, and the current collector state signal PU, which is a signal indicating states of the respective current collectors 5a and 5b are input to the control unit 14. When the current collectors 5a and 5b are pantographs, the current collector state signal PU is a signal including state information, which is a detection result or a determination result indicating whether the respective pantographs sufficiently rise and are in a contact state with the overhead wire 1.

Figure 3:
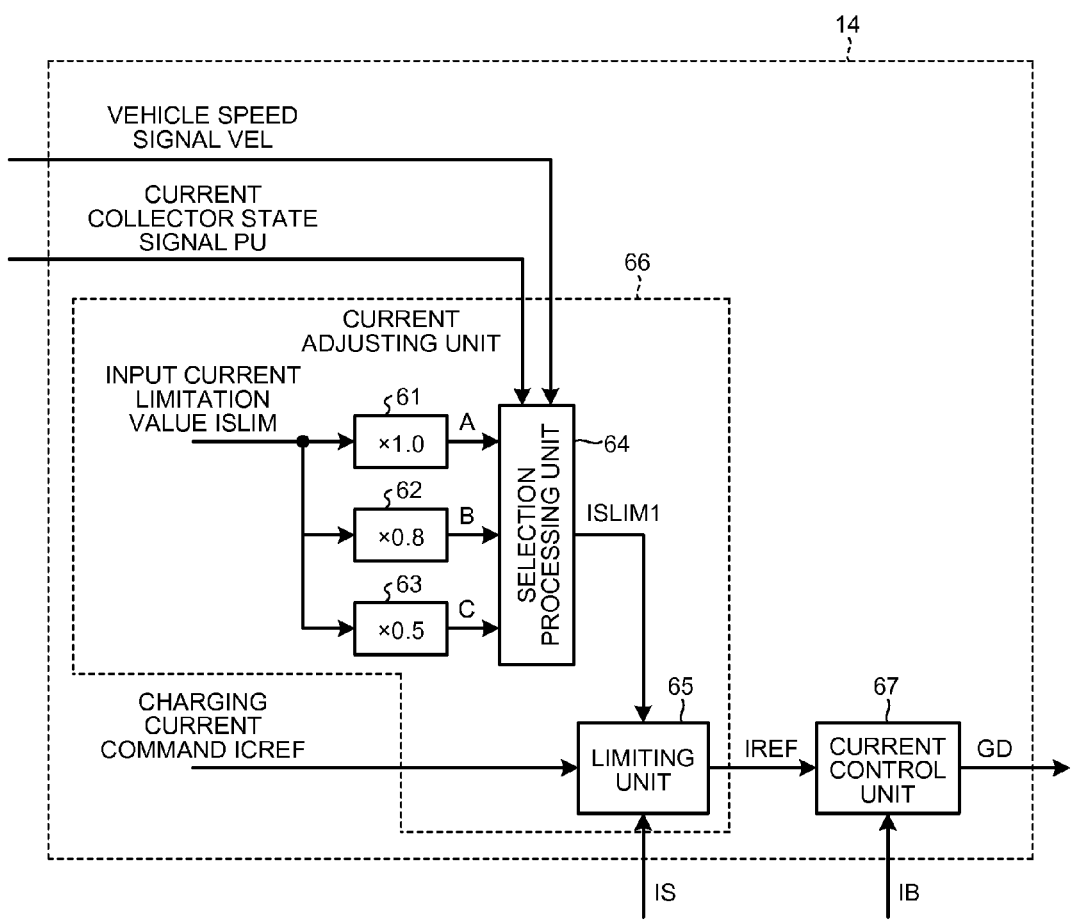
FIG. 3 is a diagram of a configuration example of a control unit in the first embodiment.

The configuration of the control unit 14 is explained. FIG. 3 is a diagram of a configuration example of the control unit 14 in the first embodiment of the present invention. As shown in FIG. 3, the control unit 14 includes a current adjusting unit 66 and a current control unit 67. The signal VEL indicating vehicle speed of the electric vehicle, the current collector state signal PU, and a charging current command ICRFE are input to the current adjusting unit 66. The current adjusting unit 66 generates a signal IREF, which is a current command value of the converter circuit 13. The signal IREF is, for example, a current command value of the output current IB from the converter circuit 13. However, the signal IREF is not limited to this.

An input current limitation value ISLIM is set on the inside of the current adjusting unit 66. ISLIM is a value indicating a limitation value of the input current IS to the converter unit 10. For example, when it is desired to limit the magnitude of the input current IS to the converter unit 10 to maximum 100 amperes, ISLIM is set to 100 amperes.

ISLIM is input to a selection processing unit 64 as signals A, B, and C respectively via a gain (an amplifier) 61, a gain 62, and a gain 63. In FIG. 3, as an example, the gain 61 is shown as 1.0 time, the gain 62 is shown as 0.8 time, and the gain 63 is shown as 0.5 time. As explained below, the signal A is used as a limitation value for an input current input when both the current collectors 2a and 2b normally rise. The signal B is used as a limitation value for an input current during traveling input when one of the current collectors 2a and 2b is not normal. The signal C is used as a limitation value for an input current during a stop of the electric vehicle input when one of the current collectors 2a and 2b is not normal. Values of the gains are not limited to the example shown in FIG. 3.

The selection processing unit 64 selects any one of the signals A, B, and C on the basis of the vehicle speed signal VEL and the signal PU and outputs the selected signal to a limiting unit 65 as a signal ISLIM1. A selection method for the signals A, B, and C is explained below.

A charging current command ICREF is input to the limiting unit 65. The charging current command ICREF is a command value of a charging current for the electric vehicle to perform charging from the overhead wire 1 for charging to the power storage unit 50. The charging current command ICREF can be a value set in advance on the inside of the control unit 14 or can be a value input from the outside.

The limiting unit 65 limits the magnitude of the charging current command ICREF on the basis of the input current IS and the signal ISLIM1 and generates the signal IREF. Specifically, the limiting unit 65 suppresses the magnitude of the charging current command ICREF and generates the signal IREF to prevent the magnitude of the input current IS to the converter unit 10 from becoming larger than the signal ISLIM1. Note that, besides being directly input as shown in the figure, the input current IS can also be calculated from the current IB or the like. Therefore, the limiting unit 65 can be configured to calculate the input current IS from the current IB.

The signal IREF is input to the current control unit 67. The current control unit 67 carries out feedback control to set an electric current (e.g., IB) of the converter unit 10 to a value indicated by the signal IREF. The current control unit 67 generates GD, which is an ON/OFF signal to the switching device of the converter circuit 13, and outputs the ON/OFF signal GD.

Operations are explained. It is assumed that the electric vehicle arrives at a chargeable station in a non-electrified section, lifts the current collectors 2a and 2b, and performs charging to the power storage unit 50 with electric power from the overhead wire 1.

A target value of the magnitude of a charging current to the power storage unit 50 is determined according to the charging current command ICREF. A current value that can be fed to each of the current collectors 2a and 2b is assumed to be, for example, 100 amperes. The current value is a value determined according to a contact area, a contact pressure, a material, and the like of contact places of the current collectors 2a and 2b and the overhead wire 1. The current value is a value determined in advance to prevent the temperature of the contact places from becoming excessively high. When an electric current exceeding this current value is fed, the contact places are overheated by electric resistance of the contact places and causes damage such as erosion and fusing of the current collectors 2a and 2b and the overhead wire 1.

When the current value that can be fed to each of the current collectors 2a and 2b is 100 amperes, as the input current limitation value ISLIM, 200 amperes, which is a total current of the current collectors 2a and 2b, is set. Therefore, the signal A is a value indicating 200 amperes, the signal B is a value indicating 160 amperes, and the signal C is a value indicating 100 amperes.

The selection processing unit 64 determines the signal ISLIM1, for example, as explained below according to the current collector state signal PU and the vehicle speed signal VEL.

<Case A>

When the vehicle speed signal VEL is equal to or smaller than a predetermined value, that is, when the electric vehicle is determined as stopping, if the current collector state signal PU indicates that both of the current collectors 2a and 2b are in a state in which the current collectors 2a and 2b are determined as being normally in contact with the overhead wire 1, the selection processing unit 64 selects the value of the signal A as the signal ISLIM1 and outputs the value. That is, the signal ISLIM1=200 A.

<Case B>

When the vehicle speed signal VEL is equal to or smaller than the predetermined value, that is, when the electric vehicle is determined as stopping, if the current collector state signal PU indicates that any one of the current collectors 2a and 2b is in a state in which the current collectors is determined as being not normally in contact with the overhead wire 1, the selection processing unit 64 selects the value of the signal C as the signal ISLIM1 and outputs the value. That is, the signal ISLIM1=100 A.

<Case C>

When the vehicle speed signal VEL is larger than the predetermined value, that is, when the electric vehicle is determined as traveling, if the current collector state signal PU indicates that any one of the current collectors 2a and 2b is in a state in which the current collector is determined as being not normally in contact with the overhead wire 1, the selection processing unit 64 selects the value of the signal B as the signal ISLIM1 and outputs the value. That is, the signal ISLIM1=160 A.

The limiting unit 65 adjusts, on the basis of the signal ISLIM1 generated in this way, the magnitude of the charging current command ICREF and generates the signal IREF such that the input current IS to the converter unit 10 is equal to or smaller than the signal ISLIM1. The current control unit 67 performs control of the switching device of the converter circuit 13 on the basis of the signal IREF.

According to the operation explained above, for example, when charging is performed during the stop of the electric vehicle, if the current collector 2a is broken and cannot rise, it is possible to control an input current to the converter unit 10 to be equal to or smaller than a current value that can be fed by the other non-defective current collector 2b. Therefore, it is possible to prevent the remaining non-defective current collector 2b from being damaged by an excessively large current. That is, it is possible to charge the power storage unit 50 within a range of an ability of the non-defective current collector 2b.

When charging is performed during the traveling of the electric vehicle, for example, if the current collector 2a is broken and cannot rise, it is possible to limit an input current to the converter unit 10 to be equal to or smaller than a current value that can be fed while the other non-defective current collector 2b is traveling. During the traveling, compared with when the electric vehicle stops, a temperature rise of the contact place is suppressed because the contact place with the overhead wire 1 moves while sliding. Therefore, a current value that can be fed to the current collector increases. In the above example, the electric current that can be fed to each of the current collectors 2a and 2b during the traveling is set to 160 amperes. Note that a ratio of the electric current that can be fed to the current collectors 2a and 2b during the stop and the electric current that can be fed to the current collectors 2a and 2b during the traveling is not limited to this example (100 A:160 A).

In this way, during the traveling, it is possible to increase the electric current of the non-defective current collector 2b within a possible range (a range in which the current collector 2b is not damaged). It is possible to charge the power storage unit 50 within a range of the ability of the non-defective current collector 2b.

Note that, as a simple form, the electric vehicle control apparatus can be configured not to use a condition of the vehicle speed signal VEL. For example, the electric vehicle control apparatus can be configured to perform control as explained below using only a state of the current collector state signal PU. Note that, in this case, the gain 62 among the gain 61, the gain 62, and the gain 63 can be deleted.

<Case D>

When the current collector state signal PU indicates that both of the current collectors 2a and 2b are in a state in which the current collectors 2a and 2b are determined as being normally in contact with the overhead wire 1, the selection processing unit 64 selects the value of the signal A as the signal ISLIM1 and outputs the value. That is, the signal ISLIM1=200 A.

<Case E>

When the current collector state signal PU indicates that any one of the current collectors 2a and 2b is in a state in which the current collector is determined as being not normally in contact with the overhead wire 1, the selection processing unit 64 selects the value of the signal C as the signal ISLIM1 and outputs the value. That is, the signal ISLIM1=100 A.

The limiting unit 65 adjusts, on the basis of the signal ISLIM1 generated in this way, the magnitude of the charging current command ICREF and generates the signal IREF such that the input current IS to the converter unit 10 is equal to or smaller than the signal ISLIM1. The current control unit 67 performs control of the switching device of the converter circuit 13 on the basis of the signal IREF.

According to the operation explained above, for example, when charging is performed during the stop of the electric vehicle, for example, if the current collector 2a is broken and cannot rise, it is possible to control an input current to the converter unit 10 to be equal to or smaller than a current value that can be fed by the other non-defective current collector 2b. Therefore, it is possible to prevent the remaining non-defective current collector 2b from being damaged by an excessively large current. That is, it is possible to charge the power storage unit 50 within a range of an ability of the non-defective current collector 2b.

Note that, in the above explanation, the charging operation for the power storage unit 50 is explained. However, the operation for setting a limitation value on the basis of the current collector state signal PU can also be applied to an operation for discharging electric power of the power storage unit 50 to the overhead wire 1. For example, when the electric vehicle travels on a continuous downhill grade in a non-electrified section with a regenerative brake, it is assumed that electric energy exceeding the capacity of the power storage unit 50 is regenerated. However, in such a case, an operation for discharging excess electric energy is necessary. In this discharge, when any one of the current collectors 2a and 2b does not normally rise, as in the case of the charging operation for the power storage unit 50, by limiting a discharge current in the discharging to the overhead wire 1, it is possible to prevent the non-defective current collector from being damaged.

Second Embodiment

Figure 4:
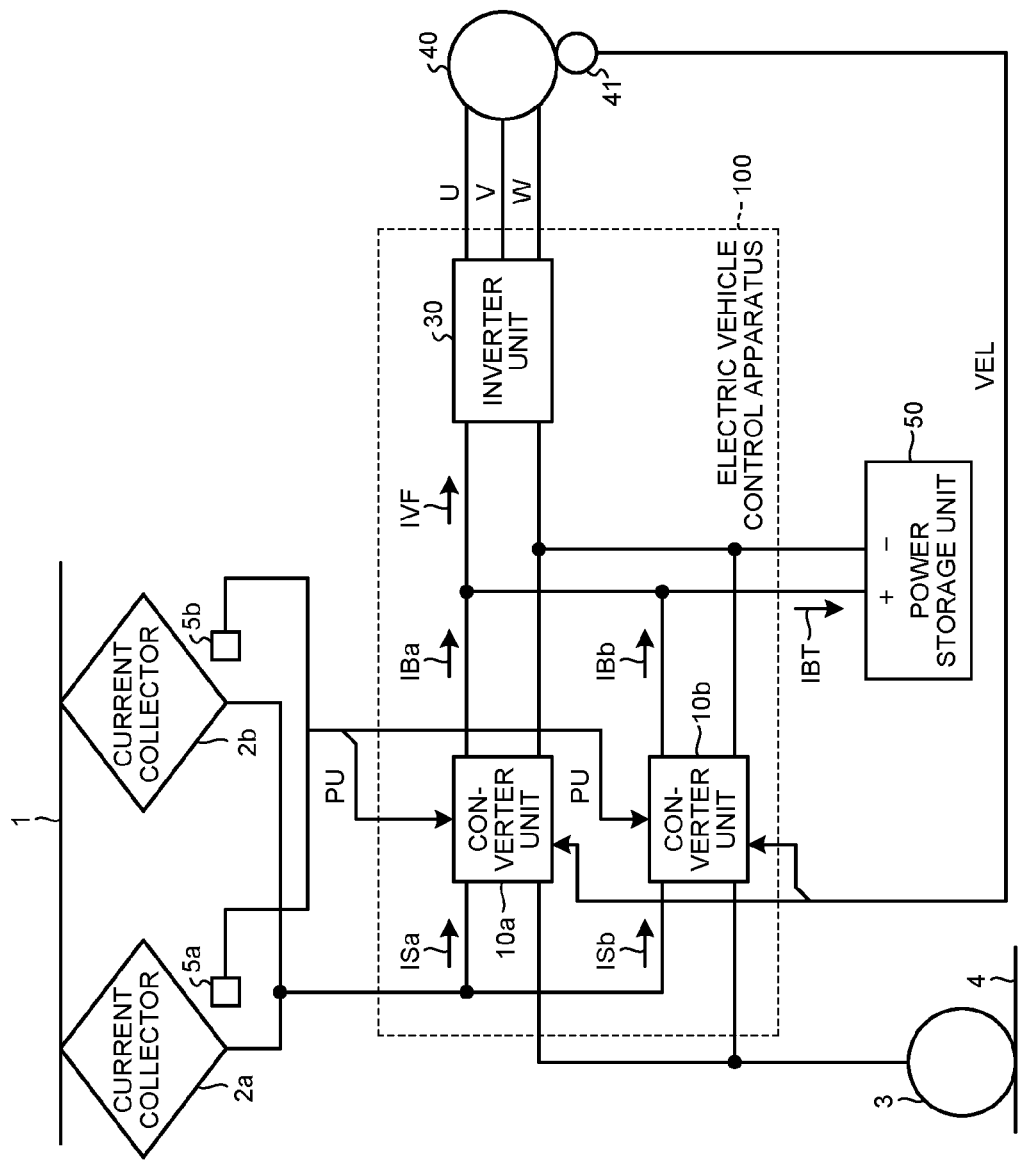
FIG. 4 is a diagram of a configuration example of an electric vehicle control apparatus in a second embodiment.

FIG. 4 is a diagram of a configuration example of a second embodiment of the electric vehicle control apparatus according to the present invention. Constituent elements having functions same as the functions of the constituent elements in the first embodiment are denoted by reference numerals and signs same as the reference numerals and signs in the first embodiment and redundant explanation of the constituent elements is omitted. Only differences from the first embodiment are explained below.

As shown in FIG. 4, in this embodiment, a converter unit includes two converter units 10a and 10b connected in a parallel relation. Both of the converter units 10a and 10b are connected to the current collectors 2a and 2b. The current collector state signal PU is input to each of the converter units 10a and 10b. Note that, in an example shown in FIG. 4, the converter unit includes the two converter units. However, the present invention can be applied as long as the converter unit includes two or more converter units.

The internal configuration of each of the converter units 10a and 10b is the same as the configuration shown in FIG. 2 in the first embodiment and includes the converter circuit 13 and the control unit 14.

Figure 5:
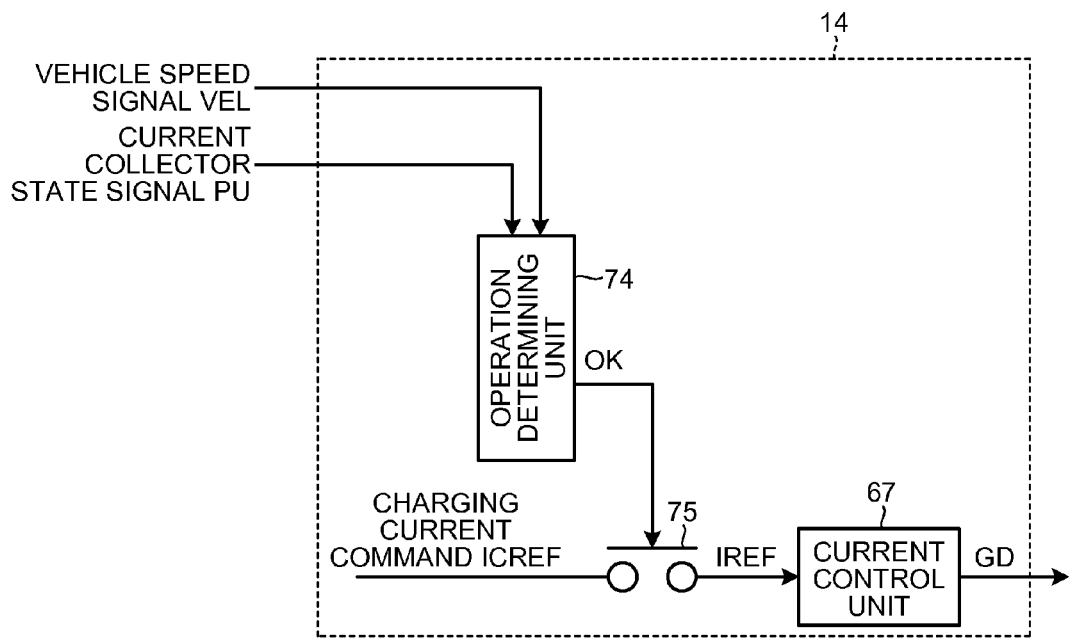
FIG. 5 is a diagram of a configuration example of a control unit in the second embodiment.

FIG. 5 is a diagram of a configuration example of the control unit 14 in this embodiment. The control unit 14 in this embodiment includes an operation determining unit 74, a switch 75, and a current control unit 67. The vehicle speed signal VEL and the current collector state signal PU are input to the control unit 14 in this embodiment. The ON/OFF signal GD to the switching element incorporated in the converter circuit 13 is output from the control unit 14.

When the vehicle speed signal VEL and the current collector state signal PU are input to the operation determining unit 74, the operation determining unit 74 performs determination explained below.

<Case A>

When the vehicle speed signal VEL is equal to or smaller than a predetermined value, that is, when the electric vehicle is determined as stopping, if the current collector state signal PU indicates that both of the current collectors 2a and 2b are in a state in which the current collectors 2a and 2b are determined as being normally in contact with the overhead wire 1, the operation determining unit 74 outputs a signal OK. Consequently, the switch 75 is closed. The charging current command ICREF is output to the current control unit 67 as the current command IREF. A charging operation is carried out on the basis of the current command IREF.

<Case B>

When the vehicle speed signal VEL is equal to or smaller than the predetermined value, that is, when the electric vehicle is determined as stopping, if the current collector state signal PU indicates that any one of the current collectors 2a and 2b is in a state in which the current collector is determined as being not normally in contact with the overhead wire 1, the operation determining unit 74 of the converter unit 10a (or the converter unit 10b) does not output the signal OK. Consequently, the switch 75 is opened. The charging current command ICREF is cut without being output to the current control unit 67. The current command IREF decreases to zero. Therefore, an electric current of the converter unit 10a (or the converter unit 10b) decreases to substantially zero and the charging operation stops.

As a logical example in which the signal OK is not output, for example, the current collectors and the converter units are regarded as a pair and the control unit 14 of the converter unit 10a does not output the signal OK when it is determined on the basis of the current collector state signal PU that the current collector 2a is not normally in contact with the overhead wire 1. Similarly, the control unit 14 of the converter unit 10b does not output the signal OK when it is determined that the current collector 2b is not normally in contact with the overhead wire 1.

Note that a relation between states of the current collectors 2a and 2b and the converter units 10a and 10b that stop the charging operation can be opposite to the relation explained above.

When the vehicle speed VEL is larger than the predetermined value and the current collector state signal PU indicates that any one of the current collectors 2a and 2b is in a state in which the current collector is determined as being not normally in contact with the overhead wire 1, the control unit 14 can output the signal OK or cannot output the signal OK. For example, the control unit 14 is configured to, even when the current collector state signal PU indicates that any one of the current collectors 2a and 2b is not normally in contact with the overhead wire 1, output the signal OK under a condition that the current collector does not change to an overheated state if the electric vehicle is traveling and, even during the traveling, when the current collector state signal PU indicates that any one of the current collectors 2a and 2b is not normally in contact with the overhead wire 1, not to output the signal OK under a condition that the current collector changes to the overheated state.

The electric vehicle control apparatus can be configured to determine in advance the converter unit that stops the charging control operation and, when it is determined that any one of the current collectors 2a and 2b is not normally in contact with the overhead wire 1, stop the charging operation for the converter unit.

That is, as a concept, a configuration other than the configuration explained above can be adopted as long as the electric vehicle control apparatus is configured to select, on the basis of a signal indicating a state of each of a plurality of electrically connected current collectors, whether a charging operation for a plurality of converter units connected to the current collectors is carried out or stopped (whether presence or absence of an electric current of the converter units).

In this embodiment, the operation determining unit 74 and the switch 75 are equivalent to a current adjusting unit that adjusts a value of the current command IREF. The operation determining unit 74 and the switch 75 carry out and stop the charging operation for the converter units by setting a value of the current command IREF to ICREF or zero.

In FIG. 4, the number of the current collectors and the number of the converter units are two. However, the number of the current collectors and the number of the converter units are not limited to this. For example, when three current collectors and three converter units are provided, the charging operation for the converter units equivalent to the number of the current collectors determined as being not normally in contact with the overhead wire 1 is stopped.

As a simple form, the electric vehicle control apparatus can be configured to select on the basis of only the current collector state signal PU whether the charging operation for the converter unit is carried out or stopped. For example, when the current collector state signal PU indicates that any one of the current collectors 2a and 2b is in a state in which the current collector is determined as being not normally in contact with the overhead wire 1, the electric vehicle control apparatus stops any one of the converter units 10a and 10b.

As explained above, in the present invention, the control unit 14 is configured to generate a current command, which is a command for an electric current of the converter unit functioning as a main circuit unit, and control the electric current of the converter unit 10 as desired on the basis of the current command. The current collector state signal PU indicating at least state of the current collectors is input to the control unit 14. The control unit 14 includes the current adjusting unit that adjusts the magnitude of the current command on the basis of the current collector state signal PU.

In the present invention, when the current collector state signal indicates that any one of a plurality of current collectors is in a state in which the current collector is not normally in contact with the overhead wire 1, that is, a state in which electric power cannot be taken in, the control unit 14 adjusts the magnitude of the current command to further reduce the electric current of the converter unit than when all the current collectors are in a normal state.

Note that the configurations explained in the embodiments indicate examples of contents of the present invention. It goes without saying that the configurations can be combined with other publicly-known technologies and the configurations can be changed to, for example, omit a part of the configurations without departing from the spirit of the present invention.

INDUSTRIAL APPLICABILITY

As explained above, the electric vehicle control apparatus according to the present invention is useful for a use as an electric vehicle control apparatus that charges a power storage device during traveling or during a stop.

REFERENCE SIGNS LIST

1 Overhead wire (Conductor)
2a, 2b Current collector (Pantographs)
3 Wheel
4 Rail
5a, 5b Current-collector-state detecting units
10, 10a, 10b Converter units (Power converting units)
13 Converter circuit
14 Control unit
30 Inverter unit
40 Electric motor
41 Rotation detector
50 Power storage unit
61, 62, 63 Gains
64 Selection processing unit
65 Limiting unit
66 Current adjusting unit
67 Current control unit
74 Operation determining unit
75 Switch
100 Electric vehicle control apparatus

The invention claimed is:
1. An electric vehicle control apparatus comprising:
a plurality of current collectors that take in electric power from an outside;
a power converting unit that converts a voltage input through the current collectors into a direct current having a predetermined value and outputs the direct current; and
a power storage unit connected to and charged and discharged by the power converting unit,
wherein the power converting unit includes a main circuit unit and a control unit,
wherein the control unit includes:
a current adjusting unit that generates a current command which is a command for an electric current of the main circuit unit, and adjusts the magnitude of the current command on the basis of a current collector state signal and a vehicle speed signal, the current collector state signal indicating whether the current collectors are in a state in which the current collectors can normally take in the electric power from the outside, the vehicle speed signal indicating a vehicle speed; and
a current control unit that controls the electric current of the main circuit unit on the basis of the current command,
wherein where the current collector state signal indicates that any one of the current collectors is in a state in which the current collector cannot normally take in the electric power, the control unit adjusts the magnitude of the current command to reduce an input current to the power converting unit and adjusts the magnitude of the current command to further reduce the magnitude of the electric current when it is determined on the basis of the vehicle speed signal that the electric vehicle is stopping than when it is determined that the electric vehicle is traveling.

2. The electric vehicle control apparatus according to claim 1, wherein, when the current collector state signal indicates that any one of the current collectors is in a state in which the current collector cannot normally take in the electric current, the current adjusting unit adjusts the magnitude of the current command to reduce the electric current than in a state in which all the current collectors can normally take in the electric power.

3. The electric vehicle control apparatus according to claim 1, wherein, if the current collector state signal indicates that any one of the current collectors is in a state in which the current collector cannot take in the electric current, the current adjusting unit adjusts the magnitude of the current command to increase the magnitude of the electric current when the vehicle speed signal is larger than a predetermined value than when the vehicle speed signal is smaller than the predetermined value.

4. An electric vehicle control apparatus comprising:
a plurality of current collectors that take in electric power from an outside;
a plurality of power converting units that convert a voltage input through the current collectors into a direct current having a predetermined value and outputs the direct current; and
a power storage unit connected to and charged and discharged by the power converting unit,
wherein the power converting unit includes a main circuit unit and a control unit,
wherein the control unit generates a current command which is a command for an electric current of the main circuit unit, controls the electric current of the main circuit unit on the basis of the current command, and controls presence or absence of the electric current of the main circuit unit on the basis of a current collector state signal and a vehicle speed signal, the current collector state signal indicating whether the current collectors are in a state in which the current collectors can normally take in the electric power from the outside, the vehicle speed signal indicating a vehicle speed, and wherein when the vehicle signal is equal to or smaller than a predetermined value and when the current collector state signal indicates that any one of the current collectors is in a state in which the current collector cannot normally take in the electric current, the control unit suppresses the electric power of the main circuit unit and stops a charging operation for the power storage unit.

5. An electric vehicle control apparatus comprising:

a plurality of current collectors that take in electric power from an outside;

a power converting unit that converts a voltage input through the current collectors into a direct current having a predetermined value and outputs the direct current; and a power storage unit connected to and charged and discharged by the power converting unit, wherein the power converting unit includes a main circuit unit and a control unit, wherein the control unit includes:

a current adjusting unit that generates a current command which is a command for an electric current of the main circuit unit, and adjusts the magnitude of the current command on the basis of a current collector state signal and a vehicle speed signal, the current collector state signal indicating whether the current collectors are in a state in which the current collectors can normally take in the electric power from the outside, the vehicle speed signal indicating a vehicle speed; and a current control unit that controls the electric current of the main circuit unit on the basis of the current command, wherein where the current collector state signal indicates that any one of the current collectors is in a state in which the current collector cannot normally take in the electric power, the current adjusting unit adjusts the magnitude of the current command to further increase the magnitude of the current when the vehicle speed signal is greater than a predetermined value than when the vehicle speed signal is equal to or less than a predetermined value.

6. The electric vehicle control apparatus according to claim 1, wherein the current adjusting unit adjusts the magnitude of the current command to set as a first current value the magnitude of the electric current when the current collector state signal indicates that all the current collectors are in a state in which the current collectors can normally take in the electric power, set as a second current value, smaller than the first current value, the magnitude of the electric current when the current collector state signal indicates that any one of the current collectors is in a state in which the current collector cannot normally take in the electric power and when the vehicle speed signal is larger than a predetermined value, and set as a third electric current, smaller than the second electric current, the magnitude of the electric current when the current collector state signal indicates that any one of the current collectors is in a state in which the current collector cannot normally take in the electric power and when the vehicle speed signal is equal to or smaller than the predetermined value.

* * * * *